July 9, 1940.  E. W. MILLER  2,207,438
GEAR FINISHING APPARATUS
Filed Jan. 26, 1932   5 Sheets-Sheet 5
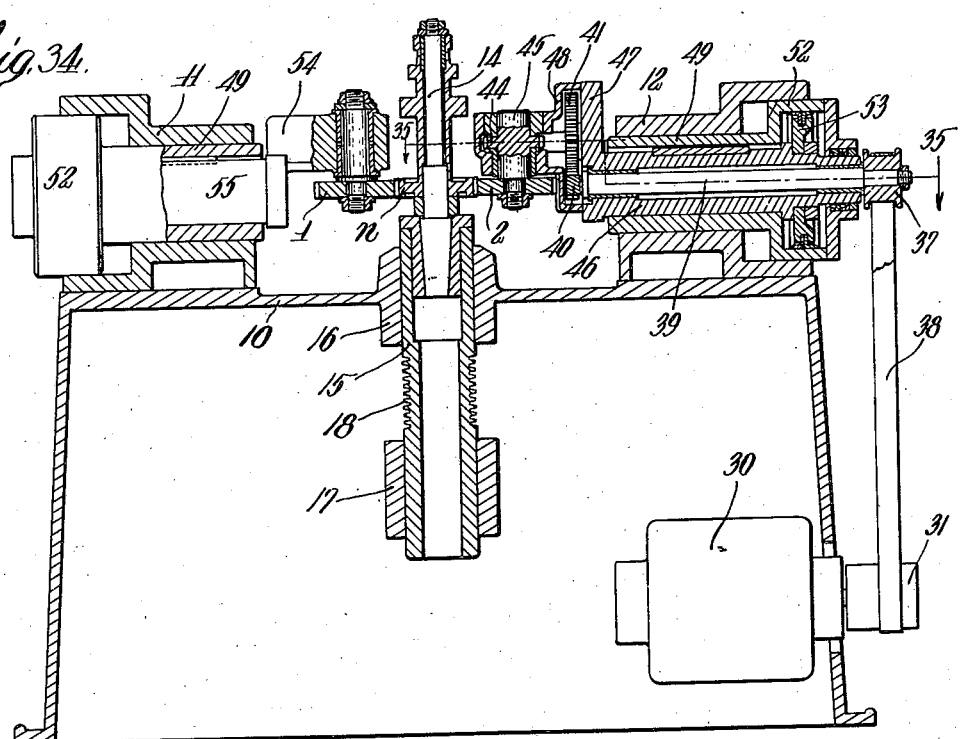
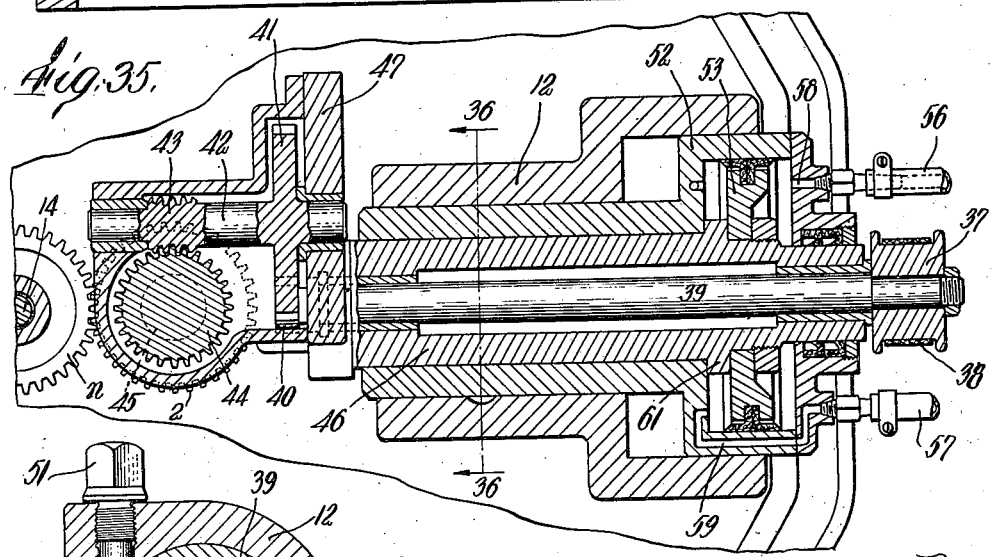
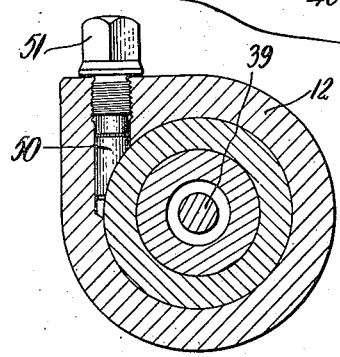
Inventor
Edward W. Miller Patented July 9, 1940

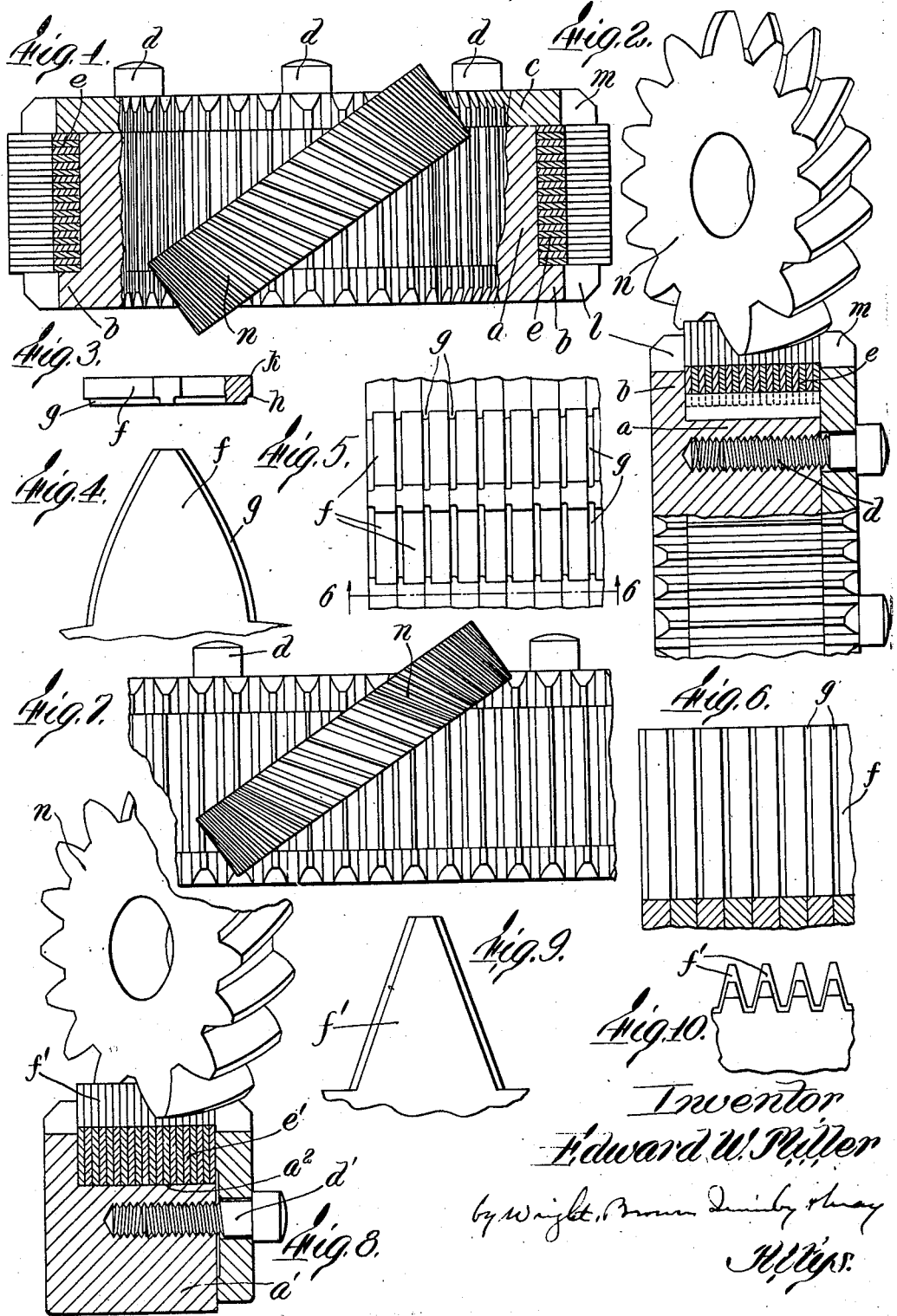

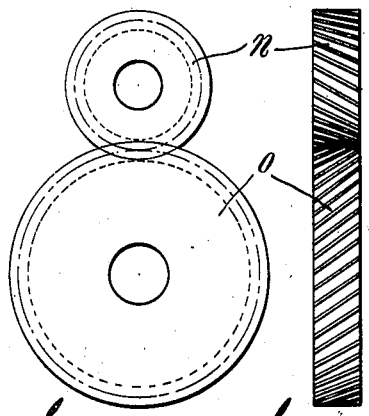
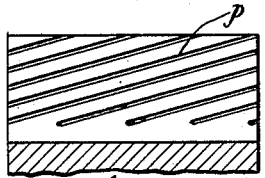 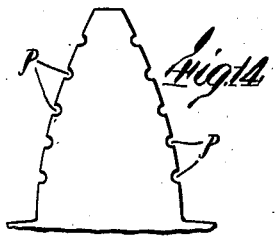
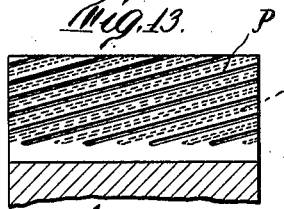 
Fig. 11.   Fig. 12.   Fig. 13.   Fig. 14.
Fig. 15.   Fig. 16.
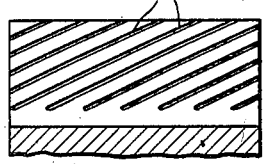 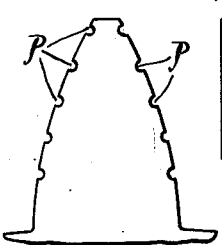 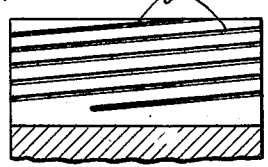 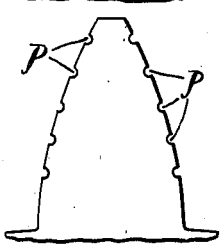
Fig. 17.   Fig. 18.   Fig. 19.   Fig. 20.
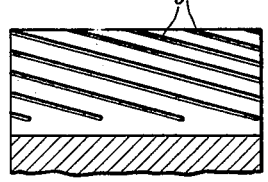 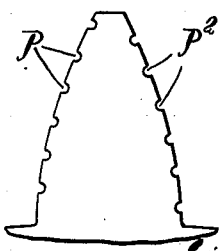 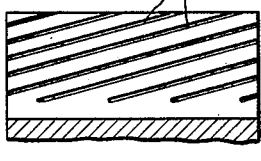
Fig. 21.   Fig. 22.   Fig. 26.
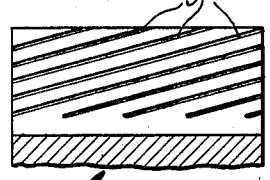 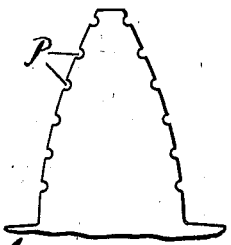 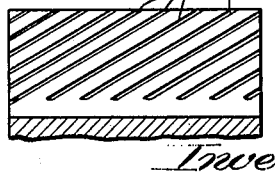
Fig. 24.   Fig. 25.   Fig. 23.
Inventor
Edward W. Miller

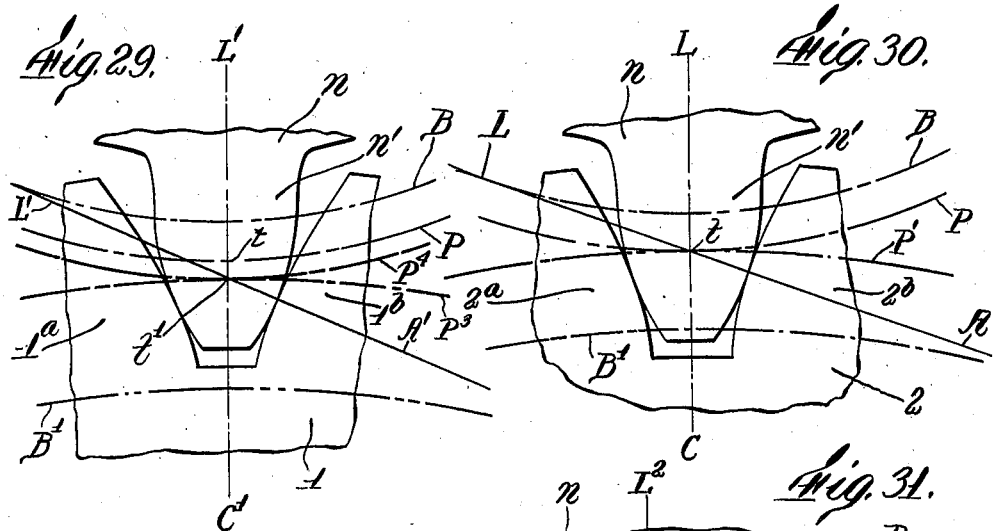
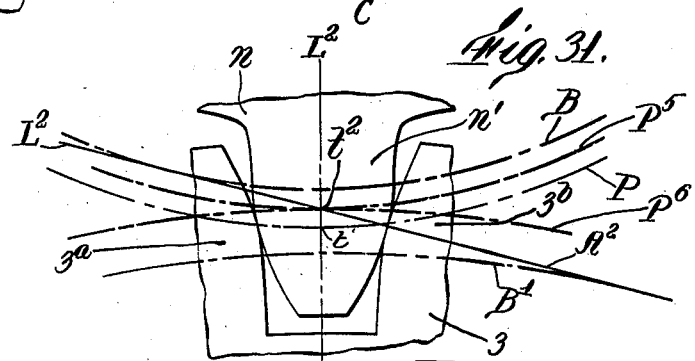
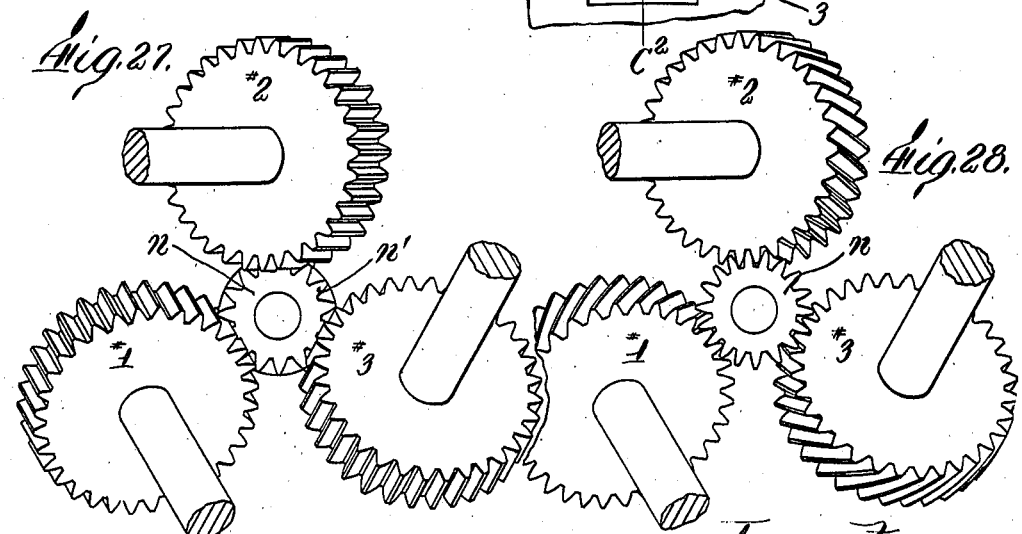

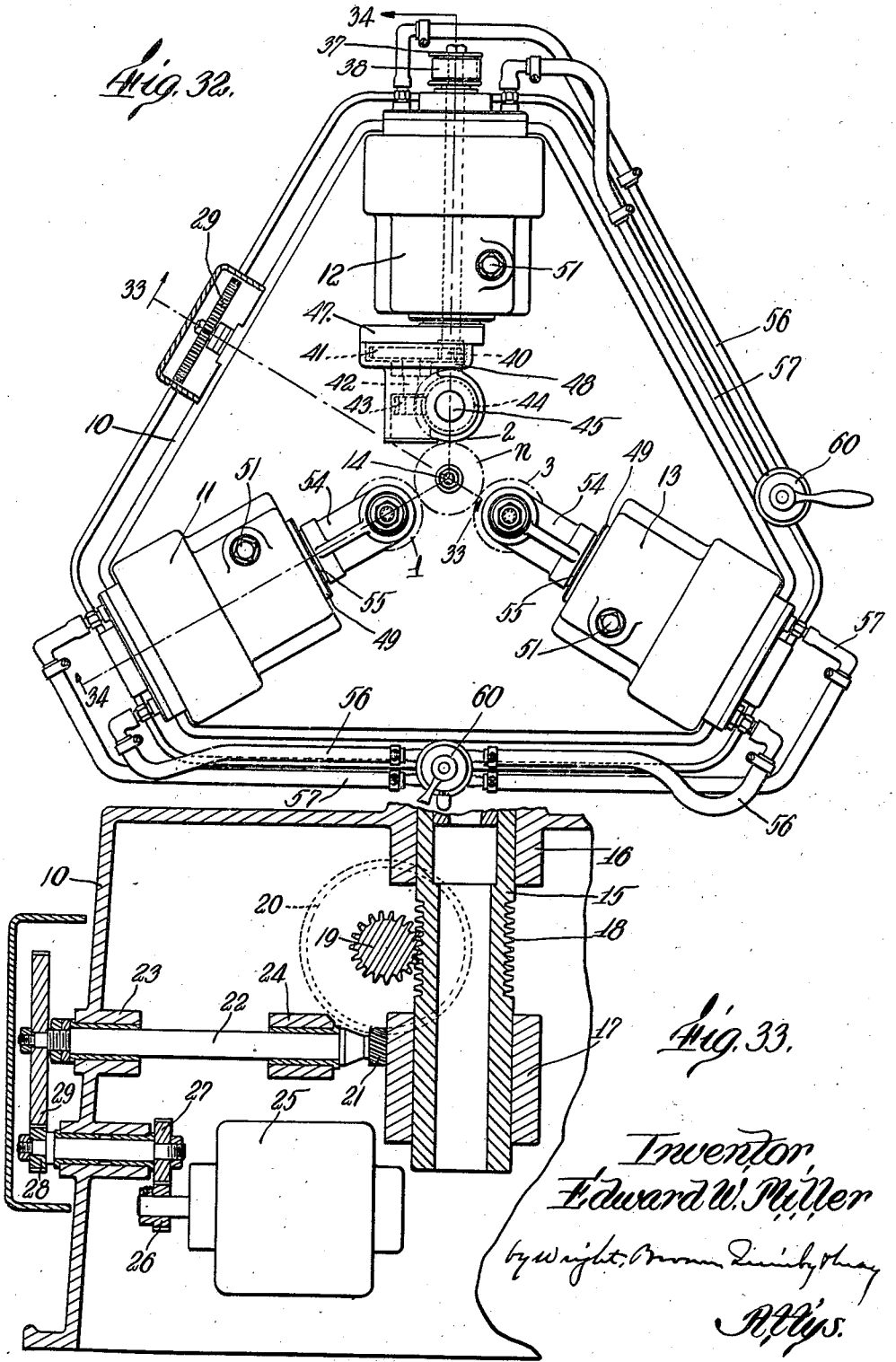

2,207,438

UNITED STATES PATENT OFFICE 2,207,438

GEAR FINISHING APPARATUS

Edward W. Miller, Springfield, Vt., assignor to The Fellows Gear Shaper Company, Springfield, Vt., a corporation of Vermont Application January 26, 1932, Serial No. 588,913

3 Claims. (Cl. 90—2)

The present invention relates to the art of finishing gears to a condition of extreme accuracy of tooth form and dimensions after having been cut to a more or less close approximation of such finished condition. Its object is to bring to the accomplishment of this result a combination of cutting and burnishing or rolling actions, simultaneously performed, whereby inequalities may be most readily and completely obliterated in a minimum of time and with a minimum of power expenditure.

The principle has long been known, and more or less widely practised, of finishing gears by burnishing, according to which a partly finished gear is run in mesh with a hardened, accurate master gear until high points or lines, tool marks and other imperfections in the surfaces of the work piece are smoothed out. This action requires heavy pressure between the master gear and the work, and is effected by minute flow or displacement of the metal in the surfaces of the work piece. It is an actual deformation and displacement of the metal of the work piece without removal of any appreciable quantity of metal from the surfaces affected. Consequently the work pieces must be cut very closely to finished dimensions before being burnished in order to make possible their reduction to exact size by burnishing.

It has also been proposed to apply a scraping action for finishing gears by using a master gear or rack of which the tooth faces are serrated to provide cutting edges, and also by the use of master gears having teeth of unequal heights with sharp edges at the intersections between their side and circumferential faces. But to the best of my knowledge such suggestions have not proved satisfactory in practice, and are not commercially used.

I have devised a new mode of action which combines cutting (of the type effected by the well known hand scraping tool) and burnishing, which is effected by the use of a master gear provided with scraper cutting edges adjacent to smooth burnishing surfaces, and moving such master gear and the work piece in conjunction with one another so that the scraping edges and burnishing surfaces are caused to travel over the tooth faces of the work piece. In the course of such traverse the scraping edges cut away metal projecting outside of the designed contours of the work, while the contiguous rubbing surfaces of the tool compress and make smoother and more compact the surfaces of the work. A condition of smoothness, compactness and surface finish equal to that of the previously known burnishing method is obtained, and the preliminary removal of metal caused by the scraping action causes the work to be reduced more quickly and more accurately to prescribed finished dimensions and form. That is, any high spots which may contain too much metal to be obliterated by burnishing alone, are separated from the work piece. A larger amount of stock may be left for removal in finishing than is possible in the burnishing operation, which eliminates the danger of possibly cutting the work piece too small in the effort to make it of a size which will require the least possible modification by burnishing in attaining the final finished condition.

Having thus indicated the purposes and general nature of the invention, I can best disclose its specific characteristics by reference to certain concrete embodiments of tools and means for operating such tools in conjunction with gears to be finished, which I have devised. Some of these embodiments are illustrated in the drawings, wherein Fig. 1 is a side view of a helical gear in mesh with a combined scraping and burnishing tool, the tool being shown partly in elevation and partly in section;

Fig. 2 is an elevation of such gear and a sectional view of part of the tool, as seen from a point of view at the right of Fig. 1;

Fig. 3 is a fragmentary end elevation, and Fig. 4 a fragmentary side elevation, of one of the elements of the tool;

Fig. 5 is a view similar to Fig. 3 of a number of the laminations of which the tool is composed, assembled together;

Fig. 6 is an elevation of the parts shown above line 6—6 in Fig. 5, and a section of the parts cut by such line;

Figs. 7 and 8 are views similar to Figs. 1 and 2, respectively, of the same invention embodying a tool of rack form;

Fig. 9 is an elevation on a larger scale of one of the elements of such rack;

Fig. 10 is an elevation of part of the rack as seen from either the right or left of Fig. 8;

Figs. 11 and 12 are elevations as seen from view points at right angles to one another of a helical tool embodying the invention meshing with a helical gear;

Figs. 13 and 14 are side and end views of a tooth of such helical tool embodying the capacity for combined cutting and burnishing action characteristic of the tools previously mentioned, but differing in detail therefrom;

Figs. 15 and 16 are similar views of a slightly modified form of the variations shown in Figs. 13 and 14;

Figs. 17–18 and 19–20 are corresponding views of still other modifications of the same principle;

Figs. 21, 22 and 23 are, respectively, a left hand face view, of an end view, and a right hand face view, of another variation;

Figs. 24, 25 and 26 are corresponding views of still another variation;

Fig. 27 is a diagrammatic elevation showing three tools of spur gear formation having the scraping and burnishing characteristics of this invention arranged for simultaneous action upon the same work piece, a helical gear;

Fig. 28 is a similar view to Fig. 27 showing helical master gear tools acting on a spur gear work piece;

Figs. 29, 30 and 31 are detail views illustrating differences from one another which may be embodied in the respective tools of Figs. 27 and 28 for better results;

Fig. 32 is a plan view of automatic mechanism, constituting part of the apparatus phase of the invention, for operating the tools of the assemblages last illustrated;

Fig. 33 is a sectional view taken on line 33—33 of Fig. 32;

Fig. 34 is a sectional view taken on line 34—34 of Fig. 32;

Fig. 35 is a horizontal section on line 35—35 of Fig. 34;

Fig. 36 is a detail cross section on line 35—36 of Fig. 35.

Like reference characters designate the same parts wherever they occur in all the figures.

The invention comprises new principles and improvements in tools of the nature and for the purpose indicated, and new combinations of such tools in cooperative association for action upon the same work piece. Figs. 1–6 inclusive illustrate one of the new forms of tool.

This tool has teeth corresponding in general arrangement to those of a straight spur gear, but is of laminated construction, made of toothed disks clamped upon a core or body and each recessed on one side to provide cutting edges and clearance spaces for chips. The core or body, designated $a$, is a solid cylinder of steel or other suitable material, having a central hole for application to a driving spindle or bearing stud, and accurately turned and finished with a true circumference concentric with the central hole. At one end it has a peripheral flange $b$ as an abutment for the toothed disks. A clamp plate $c$ is detachably secured to its opposite end by bolts $d$ and has an overlapping rim to retain the toothed disks and force them against one another and against flange $b$.

The disks are shown at $e$. They are made of any steel alloy or composition suitable for cutting and burnishing tools, of annular form, with an internal opening of dimensions to receive and fit accurately the core $a$. Their external teeth, shown enlarged at $f$ in Figs. 3, 4 and 5, are formed by known methods of gear generation conjugate to the gears on which they are designed to operate. As most gears are of the involute order, the teeth $f$ here shown generally have involute face curves and are made with any desired pitch and pressure angle by known methods of gear tooth generation. However, their faces may be modified from continuous involutes of the same pressure angle, in case it is desired to finish the work with conjugate modifications; and they may be also of other than involute form. One side of each disk is recessed at $g$ adjacent to the tooth faces, such recesses being permissibly produced by metal cutting tools before hardening or by grinding after hardening. Such recesses are here shown as extending inwardly only a short distance from the faces of the teeth, but they may be of any depth, even so far as the entire area of the tooth. These grooves, when the disks are assembled together, as shown best in Fig. 5, provide clearance spaces for chips removed by the cutting edges. Such cutting edges are formed at $h$ and $k$ by the intersection of the tooth faces with the groove boundary at one side, and with the continuous plane bounding surface at the other side of the disk. The finish grinding of the disks sharpens these edges.

It will be understood that both sides of the disks may be thus grooved, or that the disks may be in one plane throughout each side and the equivalent of the grooves $h$ provided by inserting spacer rings or washers between adjacent disks, which spacers may, if desired, have teeth of outlines lying wholly inside of the outlines of the disk teeth.

In assembling the disk on the holder or core of the tool, their teeth are accurately alined with one another before the clamp plate is made fast. A key or spline may be provided for thus alining the disks, but preferably they are left free to turn on the body and are alined by an instrument, in the nature of a bar, pin, gear tooth, etc. inserted into one of the intermediate tooth spaces.

Preferably the flange $b$ of the tool body and rim of the clamp $c$ extend outward well toward the points of the teeth on the disk, but are notched deeply enough to leave spaces registering with those between the teeth and the disks but of greater depth and width. In other words, the flange and clamp plate are provided with teeth $l$ and $m$ respectively symmetrical with the teeth of the disk but of smaller dimensions.

The tool so constituted is adapted to operate and mesh with a helical gear, such as the gear $n$ shown in Figs. 1 and 2, which is arranged with its axis inclined to the axis of the tool at an angle equal to the tooth helix angle of the gear. When either the tool or the work gear drives the other against resistance, its teeth roll in mesh with those of the other while any given point in a tooth face of the work gear slides lengthwise along the contiguous face of the contacting laminated tooth of the tool, due to the divergence between the paths of the two sets of teeth. In consequence of such displacement or sliding effect, the cutting edges of the laminations in the tool teeth scrape and cut away any protuberances on the faces of the work piece teeth, while the intermediate segments of the faces of the tool teeth press, rub and burnish the tooth faces of the work. Thus, due to the cutting action, irregularities in the faces of the work are removed more rapidly and more completely than can be done by burnishing alone, since there is a narrow limit to the amount of metal which can be permanently displaced by burnishing alone; and the burnishing action glazes, compacts and hardens the tooth faces of the work in a manner which cannot be done by cutting alone.

A mode of mounting the tool and work piece so as to drive them relatively to one another in the manner indicated, is later described.

Figs. 7–10 inclusive show the same invention applied to a rack, which differs from the spur gear type first described, in that the body or core $a'$ is a straight bar instead of a cylinder and is recessed at one side instead of circumferentially to provide a supporting surface $a^2$ for the laminated teeth. The members or laminae $e'$ composing the teeth are straight strips or narrow plates of suitable tool steel instead of being disks or rings. Of course also the teeth $f'$ have the characteristics of a rack tooth, their faces being straight instead of curved when the rack is of the involute type. The cutting edges and clearance grooves of the rack form of tool are otherwise identical with those of the spur gear tool, and the action on the work is the same. The spur gear form of course is superior in its capacity for continuous traverse in one direction, while the rack has only a limited traverse in one direction and must be reversed from time to time. In either case a relative feed traverse in the direction of the axis of the gear being operated is necessary in order to extend the finishing effect equally over all parts of the gear teeth, since the contact between the intermeshing teeth is limited to a short distance in the axial direction.

An arrangement is shown in Figs. 11 and 12 where the helical work piece $n$ is run in mesh with a helical master gear $o$ as the tool, the latter having cutting edges and intermediate clearance grooves adjoining burnishing surfaces. In this specific illustration the teeth of the master gear are arranged on an equal and opposite helical angle to that of the work piece teeth, and the axes of the two gears are parallel. This, however, is a special case, and the teeth of the two gears may be arranged at relatively different helix angles and their axes inclined to one another at an angle equal to the difference between the respective helix angles. Where the axes are parallel, there is no necessity for a feed in the direction of the axis of the work piece to distribute the effect over the entire length of the teeth of the latter. However, there is no relative cutting and rubbing traverse at the pitch circles of the gears, and the skewed arrangement is necessary to obtain this effect at those points in the faces of the work piece teeth which intersect the pitch circle.

The cutting edges for a helical gear which is designed to run on an axis other than parallel with that of the work piece, may be provided by making the tool of laminated construction, exactly as first described, with the exception that the component disks or sections then have helical faces instead of straight spur tooth faces, or by otherwise intersecting the tooth faces on planes perpendicular or inclined to the axis of the gear.

Various arrangements of grooves and cutting edges effective whether the tool axis is parallel to the work axis, or otherwise arranged, are shown in Figs. 13-26. These latter figures are arranged in groups, each group including an end view of a tooth and one or two side views on a scale smaller than that of the end view. Figs. 13 and 14 show shallow grooves $p$, in both faces of the tooth, arranged on an inclination with respect to the point to root dimension of the tooth, approximately equal to that of the lines of contact between tool and work, and the grooves on both sides being directly opposite to each other and having the same inclination. In Figs. 15 and 16 the grooves $p$ on one face of the tooth have an intermediate or staggered spacing with respect to grooves $p'$ on the opposite face. Figs. 17 and 18 show grooves at a steeper inclination than those of Figs. 13 and 15; while Figs. 19 and 20 show an inclination less steep. Figs. 21, 22 and 23 show an arrangement in which the grooves $p$ on one side are both staggered; and at a different angle of inclination to the grooves $p^2$ on the other side. Figs. 24, 25 and 26 show grooves $p$ and $p^3$ on opposite faces which are at opposite inclinations to one another.

In all these cases the intersections of the grooves with the tooth faces form cutting edges which, during the rolling and rubbing contact of tooth with tooth, cut with a scraping action the teeth of the work piece, while the intermediate smooth surfaces compress and rub the work. The angle of the cutting edges chosen for illustration in all except Figs. 17 and 19, is approximately the same as that of the line on which the tooth of the cutter may contact with a tooth of the work piece. But it will be understood from the foregoing description and the illustrative drawings that such angle may be varied in any desired degree, up to the limit of a 90° departure in either direction. In conjunction with the first illustration showing cutting edges in planes at right angles to the axis of the cutter, these illustrations make it plain that I may intersect the rubbing faces of the tool by cutting edges disposed in any locations within an exceedingly wide latitude of arrangement.

One or any desired number of tools of this character may be provided for operation at once upon the same work piece. Three is the number most suitable, as it provides an arragement whereby the pressure thrusts of the tools are equalized and balanced around the axis of the work, and tools of sufficiently large diameter may be used. Tools of either straight or helical gear formation may be arranged to act upon either straight or helical spur gears; and such tools may have their cutting edges disposed in any of the arrangements previously indicated, within limits imposed by the fact that such edges must be in some degree transverse to the direction of slip between the contacting surfaces of the tool and the work. That is, for instance, tools arranged with their axes parallel to that of the work must have cutting edges arranged otherwise than in planes perpendicular to their axes. Fig. 27 shows the situation where the tools are of spur gear formation and the work piece is a helical gear; and Fig. 28 shows one of the possible arrangements of helical tools acting on a spur gear. In each of these illustrations, all of the tools have equal inclinations to the work piece, but in the case of helical tools acting on either a spur or helical gear, the tools may have teeth of respectively different helix angles and be inclined correspondingly with respect to the work piece. Straight spur and helical gear tools may be combined for operation simultaneously on the same work piece whether the latter is a spur or a helical gear; and a helical tool with teeth at an equal and opposite angle to those of a helical work piece, arranged with its axis parallel to that of the work piece, may be combined with other tools of spur gear or helical gear formation, or both, arranged with their axes inclined in complement to the helix angle of the teeth of the work piece.

Also the different ones of a plurality of tools may be so designed as to effect a radial slip or traverse between the surfaces of contacting teeth of the tools and work over all parts of the contact surfaces. This feature may be combined with the longitudinal slip occurring when the axis of the work piece and tools are askew to one another, or it may be applied alone for finishing a straight or helical toothed gear by conjugate tools on axes parallel to the axis of the gear.

Briefly stated, this principle consists in organizing the different tools so that their pitch points, or rolling points, with the work are at respectively different distances from the axis of the work piece. It may be accomplished by making one or more of the tools over size or under side with respect to another tool which may be assumed as of standard size, or making one tool over size and another under size with respect to the standard size tool; and such tools may all have the same number of teeth, or have respectively different numbers of teeth.

This principle is illustrated diagrammatically in Figs. 29, 30 and 31, wherein 1a and 1b represent on a much enlarged scale two teeth of a tool, such as tool No. 1 shown in Fig. 27, which is assumed to be an over size tool; 2a and 2b represent two teeth of a tool, such as No. 2, assumed to be the standard size tool; and 3a and 3b represent two teeth of a tool such as No. 3, assumed to be an under size tool; represented as meshing successively with any tooth n' of a work piece n. Referring to Fig. 30, P represents the pitch circle of the work piece, B the base circle of the involute tooth face curves of the work piece, P' the pitch circle of the tool, considered as a gear, and B' the base circle of the tooth face curves of the tool. These pitch circles are the paths of those points in the gear and tool respectively which have the same peripheral speed, and correspond to cylinders in tangent contact having the same speed ratio as the gear and tool. Their respective radii are established by the distance between the centers and the speed ratio of the gear and tool. Their point of tangency t is the pitch point of the gears. According to known principles of gearing, the line of action LA tangent to the base circles and the center line LC intersect the pitch circles at the same point. No radial slip occurs between contacting tooth surfaces at the points where such surfaces are intersected by the pitch line P or P' respectively, but there is a slip of progressively increasing amount to either side of the pitch line.

The over size tool 1 is designed to be set at a greater center distance from the work piece than the tool 2, but its tooth curves are involutes of the same base circle B', or rather of a base circle having the same diameter as the base circle B' in Fig. 30. But owing to its greater center distance from the work piece, its rolling or pitch cylinder with the work piece is located at $P^3$ and that of the work piece at $P^4$, such cylinders being tangent at pitch point $t'$ which is outside of the rolling cylinder P. The line of action between these two gears is designated by $L'A'$. Thus the teeth of the tool slip on the teeth of the work piece with the desired finishing effect across the intersections of the latter with the cylinder P.

Conversely, the under size tool 3, being at a shorter center distance from the work than tool 2, rolls with the latter on cylinders $P^5$ and $P^6$ respectively tangent to one another at the point $t^2$ inside of the circumference P, with contact traveling along the line of action $L^2A^2$; the base circle of this tool having the same diameter as of the others. The radial slip between the teeth of this tool and the teeth of the work is in the opposite direction to that between corresponding tooth faces of the tool 1 and the work piece, across cylinder P.

It will be understood that two or more tools may be over size, or two or more may be under size, with respect to one or more tools which are taken as of standard size. Thus all parts of the tooth faces in the work may be scraped and burnished in the radial direction. This principle is broadly new, as I believe, for the combined action of scraping and burnishing.

In the foregoing description I have intended to indicate the wide scope of variations which may be given to the tools of this invention and in the arrangements of different tools in action simultaneously on the same work piece. But I have not attempted to illustrate or mention all of the possible variations and modifications included within the scope of the protection claimed herein.

An apparatus adapted for supporting and operating the combined scraping and burnishing tools of the preceding description in the various positions and combinations referred to, is shown in Figs. 32–36 inclusive. A suitable base 10 supports three stationary housings or guides 11, 12 and 13, arranged equiangularly about a central point with the axes or median lines of their guiding elements radial to such central point. A work arbor 14 is located at such central point, being secured by any suitable means to a tubular spindle 15 which is rotatable and movable endwise in bearings 16 and 17 rigid with the base. The work arbor is coaxial with the spindle and projects upward from the upper end of the latter. The one here shown is designed to take as the work piece the intermediate gear assemblage of an automobile transmission mechanism and hold the element n of the assemblage, which represents the work piece of the preceding description, in the plane of operation of the tools. Spindle 15 is formed in part as a cylindrical rack, having encircling teeth 18 which mesh with a pinion 19. The latter is connected with a helical gear 20 in mesh with a helical pinion 21 on a shaft 22 which is supported in fixed bearings 23 and 24 and is driven at need by a reversible motor 25 through a train of reducing gears 26, 27, 28 and 29, as plainly shown illustratively in Fig. 33. The work piece may thus be reciprocated slowly, or it may be held stationary at any height within the range of vertical movement, while the encircling rack teeth 18 permit the spindle to rotate as the work is driven by the tools.

The tool numbered 2, which may be considered as corresponding with the normal size tool of the preceding description, is the one which drives the work, the other tools being followers and being rotated by their engagement with the work piece. Driving tool 2 is driven from an electric motor 30 through pulleys 31, 37 and a belt 38, a shaft 39 on which pulley 37 is keyed, a pinion 40 on shaft 39, a gear 41 in mesh with 40 and carried by a shaft 42 which is parallel with shaft 39, a throated helical gear 43 on shaft 42, and a helical gear 44 meshing with throated gear 43 and secured to spindle 45 of tool 2.

Shaft 39 is supported in bearings in a quill or tubular slide 46 having a lateral arm 47 to which is secured a housing 48. Such arm and housing together constitute a bracket in which is contained the gearing 40, 41, 43, 44, providing bearings for shaft 42 and tool spindle 45, and by which the tool spindle is held with its axis intersecting and perpendicular to the axis of shaft 39; spindle 45 being so made that the tool 2 may be secured thereon with a median plane thereof in diametral alinement with the shaft. This arrangement permits the tool to be placed with its axis either parallel to that of the work, or at any angle corresponding to the difference between the helix angles of the teeth of the tool and work piece.

The quill or slide 46 is adapted to slide endwise and is splined to prevent rotation, in a sleeve 49 which is angularly and longitudinally adjustable in the fixed guide 12; said sleeve and guide having complemental cylindrical surfaces coaxial with shaft 39. A wedge 50 (Fig. 36) is mounted in the fixed guide and coupled with a screw 51 so that it may be used to clamp the sleeve in any position of adjustment. By this means the tool spindle may be adjusted not only as to its inclination, but also toward and away from the work spindle axis to accommodate work pieces and tools of different diameters.

In the present illustration the tool 2 is automatically fed in by fluid (hydraulic or pneumatic) pressure toward the axis of the work to a prescribed depth. Hence the sleeve 49 is made as a trunk extension of a hydraulic (or pneumatic) cylinder 52, and the slide 46 is in effect a piston rod, carrying a piston 53 equipped with packing so as to fit the cylinder fluid tight.

The other tools of the collection are mounted, adjusted and operated in essentially the same way, lacking only the provisions for being rotated by an external motor. Thus the tool 1, as shown in Fig. 34 (and correspondingly the tool 3) is mounted in an angular bracket 54 which extends from a slide 55, like slide 46 except that it may be a solid bar or rod, which is equipped with a piston and fits in a duplicate of the sleeve 49 and hydraulic cylinder 52, adjustable as before described. Pipes 56 and 57 lead to admission and exhaust ports 58 and 59 in the respective cylinders and are controlled by valves 60 so as to admit and discharge the motive fluid at proper times. Such valve operation may be performed manually or by automatic means, as desired. I do not claim as novel or original with this invention any special means for leading fluid to the hydraulic cylinders and for controlling its flow to and from the cylinders, but have adopted for my purposes a known distribution system heretofore used for other purposes. Hence I have shown the distribution system in a diagrammatic way only in Fig. 32 and without encumbering the drawings by illustration of details. That is, the hydraulic system is one of various operative means which I may employ to apply the tools with desired force to the work and feed them to prescribed depth, and typifies all such means. The limit of the depth feed is established by adjustment of the hydraulic cylinder axially in its fixed housing and by complemental stops or abutments on the tool holder or slide and the cylinder, such, for instance, as the shoulder 61, shown in Fig. 35, on the tool holder and the adjacent end wall of the cylinder. Once the cylinders have been adjusted for a given work piece, the tools may be thereafter retracted and fed to depth for all duplicate work pieces without readjustment.

In the operation of this machine the tools are engaged with the work piece under pressure, and one of the tools is positively driven so as to rotate the work and the other two tools. If the axes of the tools, or any of them, are inclined with respect to the axis of the work, the work is reciprocated slowly in the axial direction by the motor 25 so as to distribute the cutting and burnishing effect equally over the entire length of its teeth. The tools may have wider faces than the work piece, as indicated by Fig. 1, so as to provide for sufficient latitude of such reciprocating movement without danger of carrying the work piece out of mesh with the tools.

The machine last described affords provisions for mounting any of the rotary tools described in the preceding portion of this specification, in any of the relationships with the work prescribed by the character of the tool.

What I claim is:

1. A gear finishing means comprising a series of master gears arranged around the gear to be finished and in simultaneous mesh therewith at different sides thereof, different ones of said tools having teeth making respectively different angles with the axes of the respective tools, and the tools being arranged in such different angular relationship to the work gear as to cause correct mesh of their teeth with the work gear; said master gear teeth having side faces formed as burnishing surfaces and intersected by cutting edges and clearance spaces extending transversely to the direction of slip between them and the teeth of the work gear when driven in mesh with the work gear.

2. Means for finishing a spur gear comprising a plurality of master gears arranged around the gear to be finished and simultaneously in mesh therewith at different sides thereof, one of said master gears being a spur gear and another being a helical gear conjugate to the work gear, said master gears being disposed at skew angles with respect to the work gear corresponding to the angular relations between the teeth of the master and work gears, said master gear teeth having side faces formed as burnishing surfaces and intersected by cutting edges and clearance spaces extending transversely to the direction of slip between the intermeshing teeth.

3. A means for finishing gears comprising a series of master gears arranged around the gear to be finished and simultaneously in mesh therewith at different sides thereof, said master gears being arranged with their axes askew to the axis of the work gear at respectively different angles and their teeth being arranged to mesh with the work gear teeth and the teeth of such master gears and of the work gear being correspondingly inclined to effect full mesh, different ones of the master gears having pitch point engagement with the work gear at relatively different distances from the axis of the work gear, and their teeth having side faces formed as burnishing surfaces and intersected by cutting edges and clearance spaces extending transversely to the direction of slip between the intermeshing teeth.

EDWARD W. MILLER.